2,844,470
       PRESSURIZED FOOD DRESSING

Jack Akerboom, Bridgeton, and Daniel Melnick, Teaneck, N. J., assignors to The Best Foods, Inc., New York, N. Y., a corporation of New Jersey No Drawing. Application July 24, 1956
                    Serial No. 599,678

13 Claims. (Cl. 99—144)

This invention relates to a fat-in-water emulsion containing a novel pasteurized emulsifying agent and, more particularly, it pertains to a fat-in-water emulsion containing a novel pasteurized emulsifying agent which is useful in food dressings. Such food products depend upon a suitable emulsifying agent for stabilization purposes.

Microbiological growth in food dressings is inhibited to some extent by flavoring agents, e. g. vinegar and/or salt. In some food dressings these agents impart too harsh a flavor, hence the amounts are substantially reduced at the risk of microbiological spoilage. Since the keeping quality of a marketable dressing must meet a practical minimum, viz., one month, compromises between flavor and keeping quality are frequently made. Sanitary manufacturing practices and low temperature storage also contribute to extended shelf life.

Extensive investigations were made in the direction of producing a food dressing low in both salt and acid content, but still one which has adequate keeping qualities to be marketable. Since egg, one of the preferred ingredients in these food dressings, is very susceptible to microbiological spoilage, efforts were concentrated on finding a method by which the egg could be made free of spoilage organisms at the outset.

The common method for destroying microorganisms in egg material is pasteurization. However, in the case of egg yolk or whole egg, heating to temperatures of 140° F. and above causes protein denaturation, i. e., the proteins in the egg are rendered water-insoluble. Of course, with a higher temperature and a longer period of heating there is greater assurance of microbiological destruction (viz., the hard-boiled egg). Unfortunately, protein denaturation becomes so excessive that the functional value of the egg material as the stabilizer for the food dressings is adversely affected. Hence, compromise between pasteurization and functional value had to be resorted to in the past. After extensive work on our part we discovered that egg yolk material, that is, either the whole egg or egg yolk alone, could be adequately pasteurized to produce a finished product highly satisfactory in functional value (no significant protein denaturation) and with practically all of the spoilage microorganisms destroyed.

An object of this invention is to provide a method of pasteurizing egg yolk material at higher temperatures and for longer periods without causing significant denaturation changes in the egg protein.

Another object of this invention is to provide an edible dressing composition containing pasteurized egg yolk material which is less susceptible to microbiological spoilage.

Still another object of this invention is to provide a mildly acid dressing for fruits and salads, containing pasteurized egg yolk material.

A further object of this invention is to provide a bland non-acid-supplemented dressing containing pasteurized egg yolk material.

A further object of this invention is to provide aerated food dressings containing pasteurized egg yolk material.

Other objects and advantages of this invention will become apparent from the following description and explanation thereof.

Broadly, this invention is concerned with an edible composition comprising an emulsion of fat particles dispersed in an aqueous medium, the emulsion containing a water-soluble proteinaceous pasteurized egg yolk material in an amount sufficient to keep the fat particles dispersed, the fat having a melting point between about 80° and 120° F. and the fat comprising about 20 to about 50% by weight of the emulsion.

In another aspect of the invention, an edible emulsifying composition is provided which comprises a pasteurized solution of egg yolk containing material in water, the proteinaceous material of the egg yolk being water-soluble.

The mildly acid food dressing of this invention is characterized by an edible fat having a melting point of about 80° to 120° F. being dispersed in an aqueous medium containing the pasteurized egg yolk material of this invention and an acidifying agent in an amount sufficient to provide a pH of about 4 to about 6, preferably about 4 to 5. The acidifying agent must not be predominantly vinegar because the flavor becomes too harsh. Usually citric acid or lemon juice is used as the predominant or exclusive acidifying agent.

The bland non-acid-supplemented dressing is a composition comprising an edible fat having a melting point of about 80° to 120° F. dispersed in an aqueous medium containing the pasteurized egg yolk material of this invention. The pH of this product is that of the egg yolk content and is about 6 to about 7.

The compositions of this invention may be placed in suitable containers and subjected to an elevated pressure by means of a suitable propellant gas, e. g. carbon dioxide, nitrous oxide, nitrogen, etc. The resulting aerated food dressings contain both fat particles and fine gas globules dispersed in the aqueous phase containing the pasteurized egg yolk material.

The fat component which is used for the food dressings of this invention is usually of vegetable origin, has a melting point of about 80° to about 120° F., more usually about 90° to 110° F., and preferably about 93° to 100° F. When the fat is tested by the method usually applied to salad oils, employed in conventional food dressings, it has a cold test of 0.0 hour, as contrasted with the minimal standard of 5.5 hours for a conventional salad oil. When vegetable fat is employed, it is an edible material derived from any suitable vegetable source and one that has been hydrogenated to the desired extent. It is also contemplated that the fat component comprises a single ingredient or it can be a blend including oils of high and low melting points provided the final blend has the desired characteristics given above. The fat of this invention has a setting point of about 55° to about 90° F., more usually about 60° to about 80° F., and preferably about 65° to about 75° F. From the standpoint of foam stability, it is preferred to use fats having high melting points; However, as the melting point of the vegetable fat component is increased, there is a greater tendency for some of the emulsion to remain in the container after it is depressurized by expelling the propellant gas, thus representing a loss to the consumer. Stated another way, emulsions made with low melting point fats are more readily expelled from pressurized containers with the propellant gas than the high melting point fats; however, they produce foams which are less stable than those made with the higher melting point vegetable fat components. Animal fats, such as lard, may be used in the products of this invention, although vegetable fats are preferred for reasons of superior physical reproducibility and flavor stability. One of the preferred classes of vegetable fats has an iodine value of about 60 to 95, however, the iodine value can vary considerably, for example, from about 0 to 30 for tropic fats containing substantial quantities, viz., more than 50% total, of lauric and myristic acids in triglyceride form. Included in this latter group are coconut, babassu, palm kernel, etc.; provided when used either alone or as a blend with other fats, such fats are in the desired melting point and setting point range. Additionally, the fat must be in emulsified form, possess homogeneity and have the essential particle size. The requisite particle size is essential to obtaining satisfactory expressibility of the emulsion from pressurized containers, desirable foam appearance, and adequate foam overrun. Generally, the fat component comprises not more than about 50% by weight, and not lower than about 20%, more usually about 30 to about 40% by weight, and preferably about 30 to about 35% by weight, based on the total dressing prior to the addition of propellant gas. As would be expected, a dressing emulsion containing such high melting point fat in relatively low quantities compared with the water component is unstable upon standing, i. e. separating into water and fat layers. Such normally unacceptable food dressings are, however, acceptable compositions for producing stable dressing foam.

Water is an essential ingredient of the emulsion because it provides the medium for dispersion of the fat component therein. Generally, water added as such or as part or parts of other components constitutes about 20 to about 70% by weight, and preferably about 30 to about 50% by weight, based on the finished emulsion prior to gas addition, whether various types of flavoring agents are added or not. It is found that the quantity of water employed in the present emulsion can exceed the amount used in producing the emulsions which are stable for unusually long periods of time. The reason is that, despite the separation of the excess water from the emulsion to form a separate layer, there is no adverse persistent effect upon the emulsion. When such separation does occur, simple agitation of the fat-in-water emulsion and water layer, through shaking of the pressurized container, will result in re-incorporation of the water layer.

When desired, the compositions of this invention may contain an edible water binding agent, such as, for example, flour, gelatin, starch, vegetable gum, e. g. tragacanth, etc. The water binding agent can be any one of the well-known materials. In general, it is used in a quantity of at least about 0.05% by weight and up to about 4% by weight, based on the total composition. This agent serves to enhance the stability of the aerated product, the foam produced in expressing the emulsion from the pressurized container, by preventing water separating from the aerated product.

Various flavoring agents are used for the compositions of this invention, e. g. salt, sugars, sorbitol, artificial sweetening agents, vanilla, fruit flavorings, etc. In general, the flavoring agents and acidifying agents (when the latter are used) comprise about 1 to 50% by weight of the total emulsion prior to gas addition.

The egg yolk material includes egg yolk with or without egg white. Egg yolk is an excellent medium for microbiological growth, and so it is desirable to reduce the microorganism contamination to as low a level as possible. The microorganisms may be those associated with egg materials, such as the Salmonella, or those contributed from outside sources in handling these materials; in the latter group are *Staphylococcus aureus, Bacillus mesentericus,* Streptococci, putrefactive anaerobes, molds, etc. Some of these microorganisms are pathogenic so that improperly processed materials containing these microorganisms can constitute a health hazard. Others of these microorganisms are harmless to health but are responsible for spoilage of the egg materials to such a degree that these materials are no longer organoleptically acceptable. Pasteurization of egg materials in the past has been directed toward destruction of the Salmonella bacteria. This species is quite readily destroyed by moist heat so that pasteurizations, on the average at about 142° F. for about 5 minutes, has been adequate in destroying the Salmonella. When higher temperatures such as 155° F. have been employed, these have been in the category of "flash" pasteurizations since periods of heating have been of the order of 6 seconds. And yet, we find that these mild conditions for pasteurization are entirely inadequate to eliminate other potentially harmful bacteria, such as the *Staphylococcus aureus*.

It has been stated on good authority that liquid eggs cannot be pasteurized as can other products to make them safe for human consumption. The reason for the mild conditions of pasteurization observed by others has been the vulnerability of the egg protein to undergo irreversible heat denaturation changes. These affect the functional qualities of the egg yolk in stabilizing the dispersion of fat in water in food dressing compositions. In the present invention, even though some impairment of the functional properties of the egg yolk proteins occurs, the egg yolk material is useful. Our food products are to be used in the aerated state and, under these circumstances egg yolk material of somewhat impaired functional characteristics can be tolerated.

It is possible to use excessive temperature processing conditions in the present invention, because the egg yolk is desirably first diluted with water, preferably in equal amounts. When the egg yolk material is pasteurized in the undiluted state, temperatures of 150° F. for periods greater than 30 seconds and up to 40 minutes and of 165° F. for periods up to 10 minutes are employed. At the higher permissible temperature the egg material becomes very viscous and difficult to stir, even though functional value in the food dressings is not impaired. For this reason the lower pasteurization temperature of 150° F. is preferred. To our surprise the extended pasteurization at this temperature did not affect solubility of the egg yolk protein, nor its functional value for use in our food dressings. With the addition of water to the egg yolk material prior to pasteurization, it is possible to heat the solution to 165° F. for extended periods of more than 10 minutes, and up to 40 minutes without objectionable viscosity or protein denaturation changes. The 50:50 ratio of water to egg yolk material is preferred since the addition of more water as permitted in the formulation would result in processing more material without significant advantage.

The egg yolk is present in the composition in an amount of about 3 to 9% by weight based on the total composition. It is preferred to use about 4 to 7% on the same basis.

We have found that, in order to obtain a stable emulsion and a long-lasting foam after expulsion from the pressurized container, the desired ingredients of the food dressing must be maintained at a temperature at which the fat component is present in a liquid state before and during the homogenization thereof. Although our novel fat component is normally a solid at ambient temperature, it is essential that it be present in a melted state during the preparation in order to attain homogeneity of the fat particles dispersed in the aqueous medium. For the purpose of this invention, homogeneity of the fat particles means that all the fat particles have the same fat composition. Generally speaking, the fat component can be kept in the melted state when cooled to a point just above the setting point, at the melting point, or at any temperature above the melting point, such as, for example, at least 10° F. greater than the melting point. The temperature to be used in the preparation of the emulsion can be as high as about 130° F., and preferably as high as about 120° F. As a result of the homogenizing step of the preparation, our product contains the fat particles having an average particle size of less than about 10 microns, more usually less than about 5 microns, and preferably less than about 3 microns. It is found that the foams resulting from our emulsions are stable for at least 10 minutes and they have an overrun of at least about 100% and up to about 600%, preferably about 200 to 500%. The foam stability is measured at 75° F., and overrun is compared with the same salad dressing of specific gravity from 0.95 to 1.10 prior to aeration. Further, our emulsion or foam can be used on products which are stored at a temperature of about 0° F. or lower, and it will provide at the time of serving a food dressing which is homogeneous in apperance and has eating quality as good as the product possesses at room temperature prior to lower temperature storage.

The preparation of the food dressing is preferably conducted by heating the water binding agent, when used, and a portion of the water with added flavorings until the desired consistency or result is achieved, and thereafter, the temperature of this aqueous solution (e.g. starch paste) is adjusted to within the desired range for the preparation of the emulsion, viz., from 195° F. down to 120° F. The egg yolk component or portion of the dressing is prepared by first mixing the egg with a portion of the water, pasteurizing the same, and cooling to the desired temperature. The fat component is melted and also held at the desired temperature; it is combined with the egg-water mixture and the resulting mass is mixed or thoroughly agitated by a mechanical agitator. After the fat and egg solution are thoroughly mixed, the water with flavoring and with or without the water binding agent is added thereto. The acid component, when added, may be incorporated into the aqueous phase or into the blend just before, during, or after the addition of the above water component. The total mixture is passed (while the fat component is still in the melted state) through a conventional homogenizer to yield the thin pourable emulsion or dressing of this invention.

Another important step in the preparation of the emulsion is to subject the homogenized product or material to a chilling treatment or a temperature which is below the setting point of the fat, more usually at least about 10° F. below the setting point, and preferably at least about 20° F. below the setting point thereof. The temperature can be just above the freezing point of the aqueous phase of the emulsion or dressing. The chilling treatment is conducted until the fat is at least partially solidified. It is preferred that the chilling treatment be conducted after the dressing or emulsion is placed in the pressurized container and the same is subjected to propellant gas pressure. In the quiescent state, the chilling is carried on for preferably at least 24 hours, whereas with agitation, the time is preferably at least about 3 hours. It should be understood that chilling beyond 24 hours does not impair product quality. It is believed that the fat particles of the homogenized product are set during the operation. In producing the dressing foam, the container is shaken vigorously for about 10 seconds, inverted, and the foam expelled by manipulating the valve.

After the dressing is made, it is preferably placed in a suitable pressure container at a temperature at which the fat component is still in the melted state. Thereafter, the partially filled container is flushed with a soluble propellant gas for the purpose of removing any air or any other undesirable gases which may be present within the container. The container and valve used in this invention is the type disclosed in U. S. Patent No. 2,615,597. After the container has been purged with propellant gas, it is filled with a suitable edible propellant gas to a desired pressure of about 25 to about 150 p. s. i. g., more usually about 70 to about 110 p. s. i. g. The propellant gas which can be used for this purpose is well known to those skilled in the art as being one which is soluble, for example, to the extent of about 100 to 150 volumes of gas at standard conditions per 100 volumes of cold water. Specific examples of suitable propellant gases are nitrous oxide, nitrous oxide-carbon dioxide, nitrous oxide-carbon dioxide-nitrogen, etc. If carbon dioxide is used with nitrous oxide it constitutes about 10 to about 25% by volume of the total gaseous material. Further, if nitrogen is used as a component of the propellant gas, it is present in the amount of about 25 to about 45% by volume. The quantity of propellant gas which is used in the pressurized container is determined by the desired overrun and the ultimate strength of the container.

The food dressings of this invention can also be prepared and packaged in accordance with the methods disclosed in our co-pending application Serial No. 529,316, filed August 18, 1955. The disclosure in said co-pending application is hereby incorporated by reference.

It is reported in the literature—Belle Lowe, "Experimental Cookery," third edition, p. 347, John Wiley & Sons, Inc., New York—that egg white coagulates when the temperature reaches 140° F. and egg yolk at about 149° F. For the purpose of our food dressings, simple attainment of these temperatures would not produce the desired extent of pasteurization. The following data indicate the more vigorous pasteurization conditions observed in our invention. In these tests the extent of denaturation was indicated by the "Solubility index" which is described in the article by Bishov and Mitchell, Food Research, vol. 19, pp. 367–372 (1954). The egg proteins may not be truly in solution, particularly after the pasteurization treatments; they may actually be in fine colloidal dispersion. As long as the precipitating agent, picric in citric acid solution, throws the same quantity of protein out of each test system after filtration, it is concluded that all the protein has escaped heat denaturation changes (coagulation) and thereby in passing through the filter is in a state of solution. Such protein still retains functional value in the food dressings of the present invention.

For these tests, 800 grams of egg material were heated with agitation in a stainless steel canister, which was heated in a water bath. In the case of the whole egg tests, 10 gram samples were withdrawn at the designated times, cooled and the solubility index determined. The diluted egg tests were run similarly except that 20 gram samples were withdrawn for testing.

TABLE I

| Sample | Temp. (° F.) | Time (min.) | Size of Sample (gm.) | Saline Added (ml.) | Solubility Index |
|---|---|---|---|---|---|
| Control (Whole Egg) | 75 | | 10 | 40 | 1.7–1.8 |
| Whole Egg | 142 | 5 | 10 | 40 | 1.7 |
| Conventional Pasteurization | 155 | 0.1 | 10 | 40 | 1.7 |
| Whole Egg | 150 | 40 | 10 | 40 | 1.7 |
|  | 160 | 10 | 10 | 40 | 1.6 |
|  | 160 | 40 | 10 | 40 | [1]1.8 |
|  | 165 | 10 | 10 | 40 | [1]1.8 |
|  | 180 | 10 | 10 | 40 | [2]0.1 |
| Whole Egg (duluted 50:50 with Water) | 165 | 40 | 20 | 30 | 1.7 |
|  | 170 | 1 | 20 | 30 | 1.6 |
|  | 180 | 10 | 20 | 30 | [2]0.6 |
| Control (Egg Yolk)[3] | 75 | | 10 | 40 | 2.1 |
| Egg Yolk[3] | 142 | 5 | 10 | 40 | 2.0 |
| Conventional Pasteurization | 155 | 0.1 | 10 | 40 | 2.1 |
| Egg Yolk[3] (Diluted 50:50 with Water) | 150 | 40 | 20 | 30 | 2.2 |
|  | 160 | 40 | 20 | 30 | 2.0 |
|  | 170 | 10 | 20 | 30 | [1]1.8 |

[1] Very viscous and difficult to stir.
[2] Represents unsatisfactory pasteurization conditions because of reduced solubility of the excessively heated proteins.
[3] Frozen salted egg yolk, 90 parts of yolk +10 parts of salt. When this product is pasteurized at 150° F. and above without prior dilution with water, it sets up quickly, thereby interfering with heat transfer.

From the above, it can be seen that much more effective pasteurization treatments can be applied to egg yolk materials than was previously considered possible and that dilution of the egg material permitted the use of even more vigorous pasteurization conditions for even better pasteurization of the egg material.

We have characterized the pasteurization conditions, formerly used and those practiced in the present invention, by assigning to them pasteurization constants. The pasteurization constant (P. C.) is defined as:

$$P. C. = (\text{temp.}, °F. - 130° F. \times \text{time}) 10^n$$

where:

Temp., °F.=temperatures in °F. at which egg yolk material is heated.
Time=number of minutes of heating
$n=0$, when temp., °F.=140°–149° F.
$=1$, when temp., °F.=150°–159° F.
$=2$, when temp., °F.=160°–169° F.
$=3$, when temp., °F.=170°–179° F.

At 130° F. no significant pasteurization of the egg yolk materials occurs. Heretofore, the conventional practice was to use a period of 5 minutes at 142° F.; this is an increment of 12° F. over the maximal "ineffective" temperature of 130° F. Such a heat-processed egg yolk material has a pasteurization constant of 60. As temperatures are progressively increased, time is very greatly reduced to attain a comparable degree of pasteurization. Thus, in the conventional practice of using a temperature of 155° F. and a time of 0.1 minute, the pasteurization constant is 25.

In our pasteurization operations, we find that the pasteurization constant is more than 100 and less than 400,000, preferably between 3,000 and 30,000.

Many microbiological studies were conducted on the food dressings of this invention. Whereas the high-acid and salt-containing dressings of our co-pending application, Serial No. 529,316, filed August 18, 1955, keep well when stored at room temperature, still better results are obtained in the case of the similar dressings of this invention.

With the mildly-acid, lower-salt-containing dressings of our present application, pasteurization of the egg yolk materials gives greater improvement in respect to keeping quality. These products may keep when stored at 45° F. in the pressurized container even without pasteurization of the egg yolk materials; however, they are susceptible to spoilage following slight relaxations in sanitary practices during manufacture and packaging.

The keeping quality of the non-acid-supplemented dressings of the present invention is best improved by the pasteurized egg yolk materials herein described. Pasteurization alone is not adequate to preserve these dressings nor is storage of these dressings at 45° F. per se adequate. Storage of these dressings in pressurized containers is also inadequate when used as the sole means to protect these dressings. A combination of any two of these methods for preservation of non-acid supplemented dressings is also inadequate. Only a combination of all three preservative factors permits the marketing of these dressings without risk of microbiological spoilage.

Pasteurization of the egg yolk materials and subsequent blending is preferred to pasteurization of the final homogenized dressings. When the latter procedure is carried out, the degree of foam overrun and foam stability are significantly impaired. Since the aqueous phase is pasteurized during its preparation (5 minutes at 195° F.), and since the fat is sterilized during deodorization with superheated steam, only the egg yolk phase remains vulnerable to microbiological spoilage or capable of contributing spoilage microorganisms to the overall product. Hence, pasteurization of the egg yolk materials completes the pasteurization requirements. Aseptic blending of components, aseptic canning in the pressurized containers, and storage of the canned dressings at 45° F. make possible the marketing on a practical commercial scale of the non-acid supplemented dressings. Aseptic blending and canning operations are well known to those skilled in the art and call for sanitary cleaning of all equipment and containers, pasteurization or sterilization of these, and precautions in subsequent use that outside microbiological contaminants do not find their way into the foods being processed.

In the examples described below, the fat component is defined by symbols which have the following meaning: M. P.=melting point; S. P.=setting point and I#=iodine number.

*Example I*

The effect of using pasteurized egg in food dressing was determined. The following formula was employed in making a homogenized emulsion that was packed under a mixture (85:15) of nitrous oxide and carbon dioxide at a pressure of about 90 p. s. i. g.

| Ingredients: | Parts by weight |
|---|---|
| Fat (blend of hydrogenated vegetable oils, M. P.=97.5° F., S. P.=77.0° F., I#=78.0) | 33.0 |
| Sucrose | 10.0 |
| Glucose | 12.5 |
| Egg yolk (50:50 dilution with water, pasteurized at 150° F. for 20 min.) | 10.0 |
| Water | 32.2 |
| Flour | 1.0 |
| Salt | 0.3 |
| Lemon juice (5-fold concentrate) | 0.5 |
| Flavors (fruit) | 0.5 |
| Total | 100.0 |

The pasteurized egg yolk was used in food dressing A of one experiment, whereas unpasturized egg yolk was used in dressing B. The results obtained in testing the products stored at 45° F. in the pressurized containers were as follows:

| Sample | Residuum in Container, Percent | Avg. Foam Overrun, Percent | Foam stability, Min. |
|---|---|---|---|
| Food Dressing A | 15 | 281 | 70 |
| Food Dressing B | 15 | 306 | 70 |

It is apparent from the above that pasteurization of the egg yolk did not impair the acceptability (performance-wise) of the food dressing.

*Example II*

| Ingredients: | Parts by weight |
|---|---|
| Fat (lard, M. P.=100.6° F., S. P.=77.2° F., I#=69.4) | 35.0 |
| Glucose | 16.7 |
| Sorbitol | 7.0 |
| Whole egg (pasteurized at 160° F. for 10 min.) | 10.0 |
| Water | 28.9 |
| Flour | 1.0 |
| Salt | 0.4 |
| Lemon juice (5-fold concentrate) | 0.5 |
| Flavors (fruit) | 0.5 |
| Total | 100.0 |

In dressing A, the pasteurized egg was used, whereas in dressing B, the egg was not pasteurized. The homogenized products were packed in pressurized cans as in the case of Example I. Performance data are given below:

| Sample | Residuum in Container, Percent | Avg. Foam Overrun, Percent | Foam Stability, Min. |
|---|---|---|---|
| Dressing A | 12 | 296 | 30 |
| Dressing B | 12 | 291 | 30 |

It can be seen that the emulsifying property of the pasteurized egg was equivalent to that of the unpasteurized egg.

Example III

The effect of pasteurization on the emulsifying property of egg yolk was also determined with non-acid-supplemented food dressing. The following composition was used:

| Ingredients: | Parts by weight |
|---|---|
| Fat (blend of hydrogenated vegetable oils, M.P.=95.7° F., S.P.=69.8° F., I#=79.0) | 33.0 |
| Glucose | 17.7 |
| Sorbitol | 8.0 |
| Egg yolk (50:50 dilution with water, pasteurized at 155° F. for 40 min.) | 10.0 |
| Water | 30.0 |
| Flour | 1.0 |
| Salt | 0.1 |
| Flavor (vanilla) | 0.2 |
| Total | 100.0 |

Dressing A contained the pasteurized egg yolk, whereas dressing B contained the unpasteurized egg yolk dilution. The homogenized products were packed in pressurized cans as in the case of Example I.

| Sample | Residuum in Container, Percent | Avg. Foam Overrun, Percent | Foam Stability, Min. |
|---|---|---|---|
| Dressing A | 15 | 295 | 55 |
| Dressing B | 15 | 295 | 55 |

Here also, there were no objections to the use of pasteurized egg yolk in making the food dressings.

Example IV

Pasteurized egg yolk materials were also employed in making the mildly acid food dressing with the latter subjected to vigorous mixing for purpose of aeration.

| Ingredients: | Parts by weight |
|---|---|
| Fat (hydrogenated cottonseed oil, M. P.=105.2° F., S. P.=86.2° F., I#=64.0) | 35.0 |
| Egg yolk [1] | 7.4 |
| Whole egg [1] | 6.0 |
| Water | 40.2 |
| Salt | 0.5 |
| Lemon juice (5-fold concentrate) | 0.5 |
| Flavor (fruit) | 0.4 |
| Saccharin [2] | 0.02 |
| Sucrose [2] | 10.0 |

[1] 50:50 dilution with water of each component, and blend pasteurized at 155° F. for 10 min.
[2] When saccharin was added, sucrose was omitted and vice versa. Saccharin was added prior to homogenization, while sucrose was added to the aerated mass after vigorous mixing.

The results on aerating the homogenized emulsions at atmospheric pressure in a mixing bowl are reported below.

| Experiment No. | Mixing Conditions | Foam Overrun, Percent | Foam Stability, Min. |
|---|---|---|---|
| 1 | Vigorous, mechanical, for 1.5 min. (saccharin present). | 143 | more than 300. |
| 2 | Same as Experiment No. 1, but sucrose mixed in gently after the vigorous mixing. | 117 | Do. |
| 3 | Vigorously by hand, for 1.5 min. (saccharin present). | 90 | Do. |

When sugar is added in Experiment No. 1 of Example IV prior to the homogenization, the foam overrun is about 127%, and continued beating reduces this figure significantly.

Example V

For purpose of economy in processing, shipping, and storage, the amount of water in the homogenized emulsion may be substantially reduced, with the user adding the required water just prior to the aeration at atmospheric pressure in a mixing bowl. The same formulae described in Example IV were employed in Example V, except 82% of the water component (33 parts by weight) was held out in homogenizing the emulsion. The latter was very viscous and when stored at 45° F. set up as a heavy paste. To 57 parts of this emulsion were added 33 parts of water at room temperature and a series of aeration experiments was carried out as shown below.

| Experiment No. | Mixing Conditions | Foam Overrun, Percent | Foam Stability, Min. |
|---|---|---|---|
| 1 | Vigorous, mechanical, for 1.5 min. (saccharin present). | 80 | more than 300. |
| 2 | Same as Experiment No. 1 but sucrose mixed in gently after the vigorous mixing. | 60 | Do. |
| 3 | Same as Experiment No. 2 but sucrose added to the product prior to the homogenization. | 45 | Do. |

It is apparent from the performance results of these latter examples that (a) with the smaller overruns, foam stability is enhanced, (b) sugar addition is preferably made during the final stage of aeration when mixing at atmospheric pressure is employed, and (c) the full water requirement should be preferably satisfied prior to homogenization.

Having thus given a description of our invention along with specific examples, it should be understood that no undue limitations or restrictions are to be imposed by reason thereof but that the scope of the invention is defined by the appended claims.

It is claimed:

1. An edible composition comprising an emulsion of fat particles dispersed in an aqueous medium, said emulsion containing a water-soluble protein-containing pasteurized egg yolk material, said egg yolk material having a pasteurization constant of more than 100 and less than 400,000, said fat having a melting point between about 80° and 120° F., and a setting point between about 55° and 90° F., said fat particles being homogeneous in composition and having an average size of less than about 10 microns, and the fat being between about 20 and 50% by weight of the emulsion.

2. A food dressing composition comprising an emulsion of fat particles dispersed in an aqueous medium having a pH of about 4 to 6, said emulsion containing a water-soluble protein-containing pasteurized egg yolk material and an edible acidifying agent, said egg yolk material having a pasteurization constant of about 2,500 to 30,000, said fat having a melting point between about 80° and 120° F., and a setting point between about 55° and 90° F., said fat particles being homogeneous in composition and having an average size of less than about 10 microns, and the fat being between about 20 and 50% by weight of the emulsion.

3. A food dressing comprising an emulsion of fat particles dispersed in an aqueous medium having a pH of about 4 to 6, said emulsion containing a water-soluble protein-containing pasteurized egg yolk material and an acidifying agent, said egg yolk material having a pasteurization constant of about 2,500 to 30,000, said fat being a hydrogenated vegetable fat having a melting point between about 80° and 120° F., and a setting point between about 55° and 90° F., said fat particles being homogeneous in composition and having an average size of less than about 10 microns, and the fat being between about 20 and 50% by weight of the emulsion.

4. A food dressing comprising an emulsion of fat particles dispersed in an aqueous medium having a pH of about 6 to 7, said emulsion containing a water-soluble protein-containing pasteurized egg yolk material, said egg yolk material having a pasteurization constant of about 2,500 to 30,000, said fat having a melting point between about 80° and 120° F., and a setting point between about 55° and 90° F., said fat particles being homogeneous in composition and having an average size of less than about 10 microns, and the fat being between about 20 and 50% by weight of the emulsion.

5. An aerated food dressing comprising an emulsion of fat particles dispersed in an aqueous medium, said emulsion containing a water-soluble protein-containing pasteurized egg yolk material, said egg yolk material having a pasteurization constant of about 2,500 to 30,000, said fat being a hydrogenated vegetable fat and having a melting point between about 80° and 120° F., and a setting point between about 55° and 90° F., said fat particles being homogeneous in composition and having an average size of less than about 10 microns, and the fat being between about 20 and 50% by weight of the emulsion.

6. A foam-like composition adapted for use as a food dressing comprising a co-emulsion of fat particles and edible gas dispersed in an aqueous medium, said emulsion containing a water-soluble protein-containing pasteurized egg yolk material, said egg yolk material having a pasteurization constant of about 2,500 to 30,000, said fat having a melting point between about 80° and 120° F., and a setting point between about 55° and 90° F., said fat particles being homogeneous in composition and having an average size of less than about 10 microns, and the fat being between about 20 and 50% by weight of the emulsion.

7. A foam-like composition adapted for use as a dressing comprising a co-emulsion of fat particles and edible gas dispersed in an aqueous medium having a pH of about 4 to 6, said emulsion containing a water-soluble protein-containing pasteurized egg yolk material and an edible acidifying agent, said egg yolk material having a pasteurization constant of about 2,500 to 30,000, said fat being a hydrogenated vegetable fat having a melting point between about 80° and 120° F., and a setting point between about 55° and 90° F., said fat particles being homogeneous in composition and having an average size of less than about 10 microns, and the fat being between about 20 and 50% by weight of the emulsion.

8. A foam-like composition adapted for use as a dressing comprising a co-emulsion of fat particles and edible gas dispersed in an aqueous medium having a pH of about 6 to 7, said emulsion containing a water-soluble protein-containing pasteurized egg yolk material, said egg yolk material having a pasteurization constant of about 2,500 to 30,000, said fat being a hydrogenated vegetable fat having a melting point between about 80° and 120° F., and a setting point between about 55° and 90° F., said fat particles being homogeneous in composition and having an average size of less than about 10 microns, and the fat being between about 20 and 50% by weight of the emulsion.

9. An edible composition adapted to be dispensed from a pressurized container for use as a dressing comprising an emulsion of fat particles dispersed in an aqueous medium which contains a water-soluble protein-containing pasteurized egg yolk material, said egg yolk material having a pasteurization constant of about 2,500 to 30,000, said fat having a melting point between about 80° and 120° F., and a setting point between about 55° and 90° F., said fat particles being homogeneous in composition and having an average size of less than about 10 microns, the fat being between about 20 and 50% by weight of the emulsion, and said emulsion having dissolved therein an edible propellant gas.

10. An edible composition adapted to be dispensed from a pressurized container for use as a food dressing comprising an emulsion of fat particles dispersed in an aqueous medium having a pH of about 4 to 6, said emulsion containing a water-soluble protein-containing pasteurized egg yolk material and an acidifying agent, said egg yolk material having a pasteurization constant of about 2,500 to 30,000, said fat being a hydrogenated vegetable fat having a melting point between about 80° and 120° F., and a setting point between about 55° and 90° F., said fat particles being homogeneous in composition and having an average size of less than about 10 microns, the fat being between about 20 and 50% by weight of the emulsion, and said emulsion having dissolved therein an edible propellant gas.

11. An edible composition adapted to be dispensed from a pressurized container for use as a dressing comprising an emulsion of fat particles dispersed in an aqueous medium having a pH of about 6 to 7, said emulsion containing a water-soluble protein-containing pasteurized egg yolk material, said egg yolk material having a pasteurization constant of about 2,500 to 30,000, said fat being a hydrogenated vegetable fat having a melting point between about 80° and 120° F., and a setting point between about 55° and 90° F., said fat particles being homogeneous in composition and having an average size of less than about 10 microns, the fat being between about 20 and 50% by weight of the emulsion, and said emulsion having dissolved therein an edible propellant gas.

12. The composition of claim 11 wherein the propellant gas is a nitrous oxide containing gas.

13. A method of pressurizing a food dressing which comprises partially filling under aseptic conditions an enclosed zone with a food dressing obtained by combining a deodorized fat in the melted state having a melting point between about 80° and 120° F. and a setting point between about 55° and 90° F., a pasteurized aqueous medium, and a pasteurized egg yolk material, said egg yolk material having a pasteurization constant of about 2,500 to 30,000, blending the said components under aseptic conditions and at an elevated temperature sufficient to maintain said fat in the melted state, aseptically homogenizing the resulting mixture at said elevated temperature, thereby producing homogeneous fat particles of average size of less than about 10 microns, subjecting the food dressing to an elevated pressure by means of an edible, soluble propellant gas, and chilling the food dressing to a temperature below the setting point of said fat until at least partial solidification of the fat is obtained.

References Cited in the file of this patent

UNITED STATES PATENTS

| | | |
|---|---|---|
| 2,125,391 | Musher | Aug. 2, 1938 |
| 2,203,643 | Musher | June 4, 1940 |
| 2,294,172 | Getz | Aug. 25, 1942 |
| 2,458,449 | Urbain et al. | Jan. 4, 1949 |
| 2,766,126 | Hawk | Oct. 9, 1956 |